US012362576B2

(12) United States Patent
Bontrager et al.

(10) Patent No.: US 12,362,576 B2
(45) Date of Patent: Jul. 15, 2025

(54) SYSTEMS, APPARATUS, AND METHODS FOR A WIRELESS DEVICE CHARGER

(71) Applicant: Twiin Media, LLC, Atlanta, GA (US)

(72) Inventors: Dewayne Bontrager, Atlanta, GA (US); Lawayne Bontrager, Berkeley Lake, GA (US)

(73) Assignee: TWIN MEDIA LLC, Atlanta, GA (US)

( * ) Notice: Subject to any disclaimer, the term of this patent is extended or adjusted under 35 U.S.C. 154(b) by 721 days.

(21) Appl. No.: 17/573,546

(22) Filed: Jan. 11, 2022

(65) Prior Publication Data

US 2022/0224134 A1 Jul. 14, 2022

Related U.S. Application Data

(60) Provisional application No. 63/149,542, filed on Feb. 15, 2021, provisional application No. 63/135,592, filed on Jan. 9, 2021.

(51) Int. Cl.
*H01M 10/46* (2006.01)
*H01R 31/06* (2006.01)
(Continued)

(52) U.S. Cl.
CPC .......... *H02J 7/0044* (2013.01); *H01R 31/065* (2013.01); *H02J 7/0013* (2013.01); *H02J 50/10* (2016.02); *H02J 50/402* (2020.01)

(58) Field of Classification Search
CPC ...... H02J 7/0044; H02J 7/0042; H02J 7/0013; H02J 50/005; H02J 50/10; H02J 50/90; H02J 50/402; H01R 31/065; H01R 24/66
(Continued)

(56) References Cited

U.S. PATENT DOCUMENTS 5,539,821 A * 7/1996 Blonder ................ H02J 7/0044
379/454
7,180,265 B2 2/2007 Naskali et al.
(Continued)

FOREIGN PATENT DOCUMENTS

CA 2641720 A1 4/2009
CN 201199537 Y 2/2009
(Continued)

OTHER PUBLICATIONS

"Kit: Wireless Wall Charger Review," Watson, Stephen. www.whatgadgets.net. May 6, 2021 (Year: 2021).*

*Primary Examiner* — Edward Tso
(74) *Attorney, Agent, or Firm* — Christopher J Chan IP Law LLC

(57) ABSTRACT

Systems, apparatus, and methods for a wireless device charger. In one embodiment, a charger for a wireless communication device is provided. The charger can include a housing with one or more prongs configured to mount to an electrical power outlet in a wall and receive an electrical current from the electrical power outlet; at least one wireless charger component configured to convert the electrical current to a magnetic field to charge a battery associated with the wireless communication device; and at least one magnetic mount configured to support the wireless communication device in a vertical or upright orientation against the housing while the battery of the wireless communication device is charging via the at least one wireless charger component.

20 Claims, 10 Drawing Sheets

(51) Int. Cl.
*H02J 7/00* (2006.01)
*H02J 50/10* (2016.01)
*H02J 50/40* (2016.01)

(58) Field of Classification Search
USPC .................................. 320/107, 108, 114, 115
See application file for complete search history.

(56) References Cited

U.S. PATENT DOCUMENTS

| | | |
|---|---|---|
| 8,553,408 B2 | 10/2013 | Supran et al. |
| 9,060,416 B2 | 6/2015 | Supran et al. |
| 9,490,649 B2 | 11/2016 | Moore |
| 2010/0285847 A1 | 11/2010 | Greer et al. |
| 2019/0312453 A1 | 10/2019 | Rohmer et al. |
| 2020/0195015 A1 | 6/2020 | Chein |

FOREIGN PATENT DOCUMENTS

| | | |
|---|---|---|
| CN | 104079032 A | 10/2014 |
| DE | 102012213850 A1 | 2/2013 |
| EP | 2081368 A3 | 12/2009 |
| KR | 20100005698 A | 1/2010 |
| KR | 20110034773 A | 4/2011 |

\* cited by examiner

Magnetic placements of a phone

FIGURE 6A          FIGURE 6B

Duel unit using two existing wireless chargers

Stand alone feature

SYSTEMS, APPARATUS, AND METHODS FOR A WIRELESS DEVICE CHARGER

RELATED APPLICATIONS

The present disclosure claims priority to and incorporates by reference both U.S. Ser. No. 63/135,952, titled "Wireless Phone Charger Which Plugs and Mounts Directly Into An Outlet With No Cables", filed in the U.S. Patent and Trademark Office on Jan. 11, 2021; and U.S. Ser. No. 63/149,542, titled "Systems, Apparatus, and Methods for a Wireless Device Charger", filed in the U.S. Patent and Trademark Office on Feb. 15, 2021.

TECHNICAL FIELD

This disclosure generally relates to charging electrical-powered devices, and more particularly to systems, apparatus, and methods for providing a wireless device charger which plugs into and mounts to an electrical power outlet.

BACKGROUND

Conventional electrical-powered devices are sometimes powered by rechargeable batteries, such as one or more lithium-ion-type batteries. Examples of such conventional devices can include, but are not limited to, mobile phones, smartphones, personal tablet computers, microphones, speakers, earphones, headphones, electronic book or reader devices, handheld computer devices, smartwatches, personal fitness monitor devices, and charging cases for any of the foregoing.

Currently, conventional electrical-powered devices fail to provide a completely wireless charging solution because, typically, one or more extended charging cables may be needed to charge such devices. Chargers for these conventional devices generally have three foot long charging cables. Even conventional "wireless chargers" may include similar extended length charging cables even though such wireless chargers may be advertised as "wireless". In one example, a mobile phone can include an internal rechargeable battery connected to a charging port accessible in a housing or casing of the mobile phone. The charging port can be configured to receive a charging connection. The charging connection can be one end of an extended charging cable. The other end of the extended charging cable can plug into a charging plug or converter that connects to an electrical power outlet. When the charging plug is connected to the electrical power outlet, electricity can be provided via the charging plug through the extended charging cable to the charging connection, wherein the charging port can receive an electrical current to charge the internal rechargeable battery within the mobile phone. This example and other conventional devices may utilize one or more extended charging cables, which can be cumbersome to use, store, and keep track of when not in use.

In another example, a Qi-type "wireless charger" using inductance charging technology can be used to charge a mobile phone. The mobile phone may be equipped with a receiving coil and an internal rechargeable battery connected together in a housing or casing of the mobile phone. The receiving coil can be configured to be positioned adjacent to a magnetic field and using certain inductance principles generate an electrical current to charge the battery of the mobile phone. The magnetic field can be generated by a transmitting coil of the Qi-type wireless charger, wherein the transmitting coil can be one end of an extended charging cable. The other end of the extended charging cable can plug into a charging plug or converter that connects to an electrical power outlet. When the charging plug is connected to the electrical power outlet, electricity can be provided via the charging plug through the extended charging cable to the transmitting coil, wherein the magnetic field can be generated. Similar to the prior example this example utilizes one or more extended charging cables, which can be cumbersome to use, store, and keep track of when not in use.

BRIEF DESCRIPTION OF THE FIGURES

The drawings are provided for purposes of illustration only and merely depict example embodiments of the disclosure. The drawings are provided to facilitate understanding of the disclosure and shall not be deemed to limit the breadth, scope, or applicability of the disclosure. Various embodiments may utilize elements or components other than those illustrated in the drawings, and some elements and/or components may not be present in various embodiments. The use of singular terminology to describe a component or element may, depending on the context, encompass a plural number of such components or elements and vice versa.

Figure 1A:
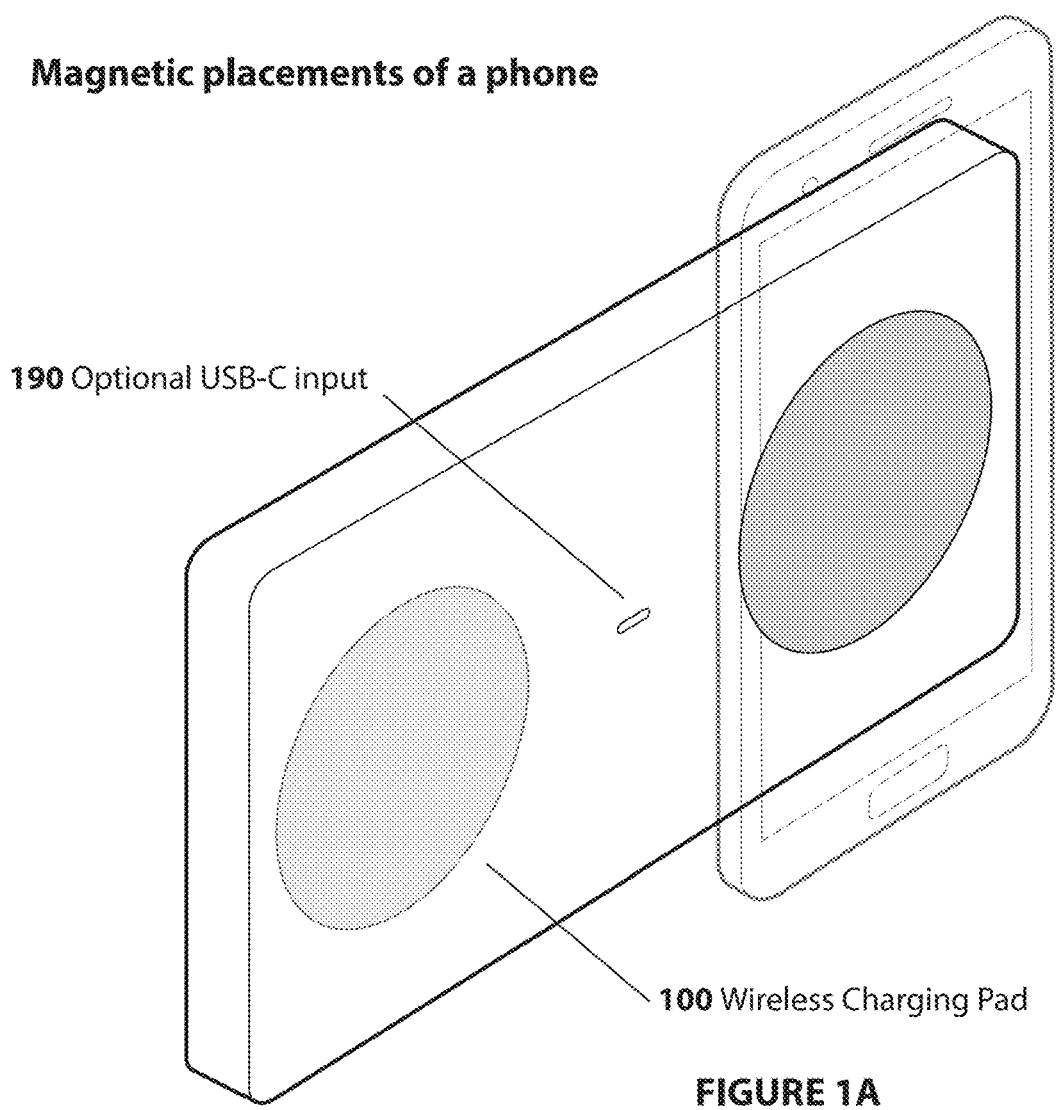
FIGS. 1A-1C illustrate example systems and apparatuses with a magnetic component configured to support a mobile phone, in accordance with embodiments of the disclosure.

This disclosure will now provide a more detailed and specific description that will refer to the accompanying drawings. The drawings and specific descriptions of the drawings, as well as any specific or alternative embodiments discussed, are intended to be read in conjunction with the entirety of this disclosure.

DETAILED DESCRIPTION

This disclosure relates to, among other things, systems, apparatus, and methods for a wireless device charger. In one embodiment, a system and apparatus for a wireless device charger can be provided. In another embodiment, a method for providing a wireless device charger can be provided. In yet another embodiment, a method for using a wireless device charger can be provided.

In one example embodiment, a system and apparatus for a wireless device charger can include a housing to permit the wireless device charger to plug into and mount directly to an electrical power outlet, such as a standard household electrical outlet. The housing for a wireless device charger can plug into and mount directly to a vertical, horizontal, or angled electrical power outlet, thus eliminating the need for any connecting charger cables or cords between the wireless device charger and, for example, a mobile phone or other electrical-powered device receiving an electrical charge or current from the wireless phone charger. Example electrical-powered devices that can be used with various embodiments of the disclosure are mobile phones, smartphones, personal tablet computers, electronic book or reader devices, hand-held computer devices, smartwatches, and personal fitness monitor devices. The system or apparatus for a wireless device charger can operate with various wireless charging technologies including but not limited to, a wireless charger component using MagSafe™ technology and/or metal plates used to securely hold or mount a mobile phone magnetically in place or a stationary position while charging via the wireless charger component.

In one embodiment, a wireless charger component can include a coil configured to receive an electrical current and generate a magnetic field, wherein the magnetic field can generate an electrical current or charge for a rechargeable battery in a wireless communication device, such as a mobile phone.

In one embodiment, a wireless charger component can include one or more magnets or magnetic components configured to receive and mount a wireless communication device, such as a mobile phone, in a desired stationary orientation.

In one embodiment, a system and apparatus for a wireless device charger can include a housing that is portable, and can be manually unplugged from one electrical power outlet, and plugged into a different electrical power outlet.

In one embodiment, the housing can be a rectangular or other geometric shape that covers an entirety of an electrical power outlet as well as any associated cover plate or housing of the electrical power outlet.

In one embodiment, a system and apparatus for a wireless device charger can include one or more magnetic charging stations or wireless charging pads, wherein each magnetic charging station or wireless charging pad can include a wireless charger component configured for mounting a portion of a wireless communication device to the component, and a wireless charging technology, such as MagSafe™.technology, for charging the wireless communication device.

In one embodiment, a system and apparatus for a wireless device charger can include one or more electrical power outlet prongs or plugs that protrude from the housing allowing the housing to plug into one or more electrical outlet power outlets.

In one embodiment, a system and apparatus for a wireless device charger can include a power supply mechanism that is concealed inside the housing. The power supply mechanism can include, for example, a chargeable or a disposable battery, and, in some instances, a charging cable for use with a chargeable battery. In this embodiment, the housing may or may not have electrical power outlet prongs or plugs.

In one example implementation of a system and apparatus for a wireless device charger, the system or apparatus can include a set of one or more prongs configured to connect to an electrical power; an internal power supply; one or more magnets, which can be placed or otherwise positioned on opposite sides of each other adjacent to an associated charging area; one or more circular or other geometrically-shaped magnetic wireless chargers; and a built-in, snap-in, or magnetically attached housing that can accommodate other built-in wireless charging technologies, such as MagSafe™ technology.

In one example embodiment of a system and apparatus for a wireless device charger, the housing can include a compartment with a power supply for charging one or more wireless communication devices, and one or more bays that accept other inserts made for different charging options. The inserts can be mechanically and/or magnetically snapped into place. These inserts can be either the charging devices themselves or encasements for existing charging products, which can hide or obscure any existing cables within the housing. The charging devices would be compatible with both MagSafe™ technology and/or after-market magnet/metal plate mounting technology. Magnets can be strategically placed in or on the housing for sufficiently mounting the mobile communication devices that are charging.

In one embodiment, an external surface of the insert can be slightly tapered or chamfered to fit a correspondingly tapered or chamfered bay or hole within an external surface or lateral side of the housing. The fit or tolerance of the fit can be relatively snug such that the insert can be manually inserted and/or removed without the use of an external or special tool such as a screwdriver or tip of a screwdriver. In at least one embodiment, an external or special tool, such as a screwdriver or tip of a screwdriver, can be used to pry or otherwise inserted into a release mechanism to remove the insert from the bay or hole. One skilled in the art will recognize how to implement a release mechanism with one or more inserts and corresponding bays or holes.

As disclosed above, embodiments of the disclosure can use MagSafe™ technology along with existing aftermarket metal plates for mobile phone cases used to mount mobile phones magnetically to other magnet mounts, such as internal car mounts. And even further, it would be cost effective for embodiments of the disclosure to accept already owned charging devices by attaching and hiding or obscuring the existing cables within the housing of a charging device. Still, further, it would be practical to customize or mix and match attachments that are needed for the mobile communication devices in individual uses.

In one example embodiment of a system and apparatus for a wireless device charger, the housing can plug into and mount directly to an electrical power outlet with no visible cables or wires.

In other example implementations, any number of options can be included and combined in a system and apparatus for a wireless device charger. These options can include one or more open bays allowing the mix and match of charging stations, existing wireless chargers configured to snap into the bays of a housing or the main structure, thus replacing the need to manufacture that respective device's technology, one or more internal or exterior mounted magnets for the use of attaching other items to the exterior of the housing or main structure, such as key rings, one or more charging stations that hold existing wireless chargers and are placed in the open bays for a variety of devices, one or more charging connectors, such as USB-C or similar connectors, to charge an additional chargeable device, one or more external male plugs for charging other devices such as an Apple™ Airpods™ charging case, and one or more external power cables for plugging into an electrical power outlet.

Embodiments of the disclosure are unique, while incorporating MagSafe™ or similar technologies, and when compared with conventional devices and solutions because there are no external cables. Additional options can add solutions for using existing charging stations to reduce manufacturing costs and hide any existing cables. Embodiments can plug directly into and hide an electrical power outlet thus eliminating the need to occupy valuable work space.

Moreover, certain embodiments of the disclosure can include one or more magnetically attached housings that can extract wireless power from the main structure with Magsafe™ technology or similar technology. These housings can accommodate built-in charging technologies which charge items, for example, an Apple™ Watch™. The one or more magnetically attached housings can include additional structures that magnetically attach to and extract wireless power from the main structure and/or a Magsafe™ charger. Each structure can hold other existing magnet charging stations that charge an item or items such as an Apple™ Watch™. Further, certain embodiments of the disclosure can include a standalone attachment that can mount to any charger, for example, MagSafe™ charger or similar charger technology, and charge other products, for instance an Apple™ Watch or AirPods™.

Further, embodiments of the disclosure are unique due to the presence of (1) one or two vertically-mounted wireless charging pads when utilizing a standard wall-mounted electrical power outlet—eliminating all cables, (2) strategically placed magnets that allow for multiple devices or items to be attached to the housing without cables, (3) an optional version that allows the use of existing charging units to be installed; using the built in power supply and hiding their existing cables, and (4) an indention/cavity is on the backside so the structure fits over an electrical wall plate thus creating the impression of a flush-to-wall mount.

One technical solution of certain embodiments of the disclosure eliminates all wires or charging cables that may be needed to supply electrical current, charge, or power to the mobile communication device, such as a mobile phone, and the charging station. In one embodiment, another technical solution includes a single or dual wall charger that inserts or otherwise plugs into a standard horizontally-oriented or vertically-oriented electrical power outlet, which is connected to a built-in power supply or the power grid. A further technical solution of certain embodiments of the disclosure is that a housing, while plugged in to the electrical power outlet, can hide, obscure, or otherwise completely cover the electrical power outlet and any associated cover plate or housing of the electrical power outlet. Yet another technical solution of certain embodiments of the disclosure is to position or otherwise mount or support a wireless communication device, such as a mobile phone, substantially parallel or close to substantially parallel to a vertical, horizontal, or angled wall that the charging device is mounted to and avoid occupying valuable work space.

Figure 1B:
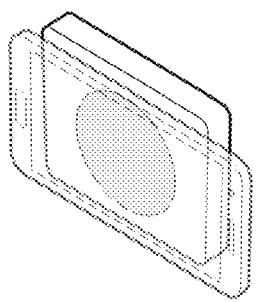
Figure 1C:
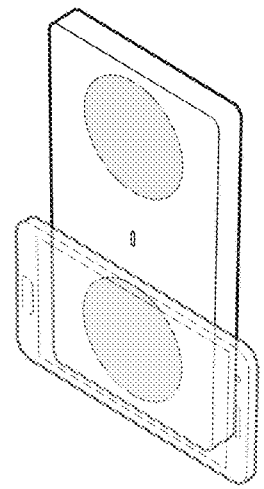

Turning to the figures, FIGS. 1A-1C illustrate example systems and apparatuses with a magnetic component configured to support a mobile phone, in accordance with certain embodiments of the disclosure. As shown in FIG. 1A, a perspective view of the example system and apparatus includes a rectangular-shaped housing with an internal power supply, and two circular-shaped wireless charging pads 100 on a lateral side of the housing. Also shown is an outline showing the orientation of a mobile phone in a vertically-oriented position that is magnetically mounted to one of the wireless charging pads and the housing in a substantially upright position. There are two wireless charging pads 100 shown with an optional USB-C-type input 190 positioned between the pads 100 and in a central portion of the lateral side of the housing. Within the housing, the internal power supply, when powered or otherwise activated, can provide an electrical charge or charging current via the wireless charging pads to the mobile phone or other wireless communication device mounted to the wireless charging pads and/or housing.

Note that a wireless communication device can be a mobile phone, smartphone, personal tablet computer, electronic book or reader device, a microphone, a speaker, a headset, an earphone, handheld computer device, smartwatch, personal fitness monitor device, or a charging case for any of the foregoing.

Also shown, in FIG. 1B, is a perspective view of another embodiment of an example system and apparatus with a magnetic component configured to support a mobile phone, in accordance with an embodiment of the disclosure. As shown in FIG. 1B, an example system and apparatus can include a rectangular-shaped housing with an internal power supply, and a single circular-shaped wireless charging pad in a lateral side of the housing. In this embodiment, an outline showing the orientation of a horizontally-oriented mobile phone is shown magnetically mounted to the wireless charging pad and the housing in a substantially upright and horizontal position.

Also shown, in FIG. 1C, is a perspective view of yet another embodiment of an example system and apparatus with a magnetic component configured to support a mobile phone, in accordance with an embodiment of the disclosure. As shown in FIG. 1C, an example system and apparatus can include a rectangular-shaped housing with an internal power supply, and two circular-shaped wireless charging pads on a lateral side of the housing. In this embodiment, an outline showing the orientation of a horizontally-oriented mobile phone is shown magnetically mounted to the wireless charging pad and the housing in a substantially upright and vertical position.

Figures 2A, 2B:
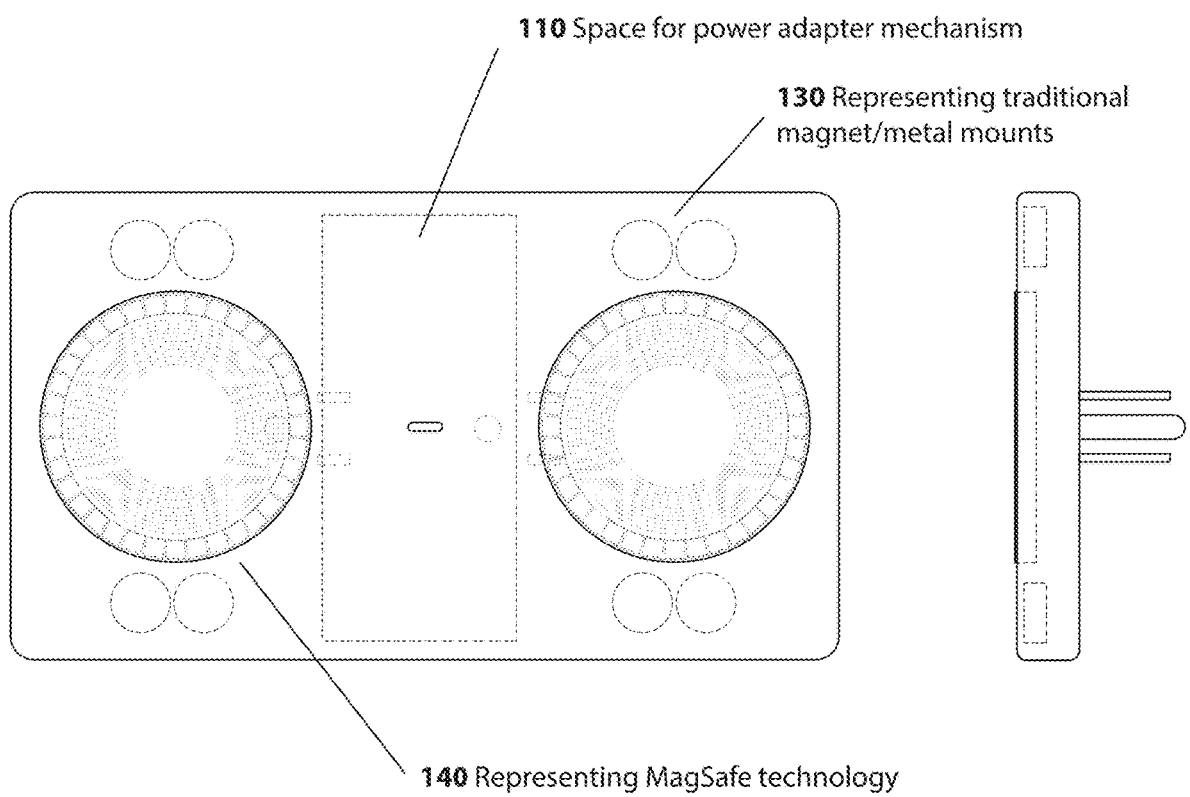
FIGS. 2A and 2B illustrate another example system and apparatus with a dual unit with two integrated wireless chargers, in accordance with an embodiment of the disclosure.

FIGS. 2A-2B illustrate another example system and apparatus with a dual unit with two integrated wireless chargers, in accordance with an embodiment of the disclosure. As shown in FIG. 2A, an example system and apparatus can include a rectangular-shaped housing with two circular-shaped wireless charging pads on a lateral side of the housing. In FIG. 2A, which is the front view of this embodiment, each of the wireless charging pads is shown with a configuration of magnets using a combination of MagSafe™ technology and traditional magnet/metal mounts. Inside of the housing, there is also sufficient space 110 for a power adapter mechanism that can convert an electrical current received from, as shown in FIG. 2B, the side view of the embodiment, a set of electrical power outlet prongs or plugs, to a magnetic field transmitted from the wireless charging pads. Traditional magnet/metal mounts 130 can allow mobile phones not equipped with MagSafe™ technology 140 to attach to one or both of the wireless charging pad.

Figures 3A, 3B:
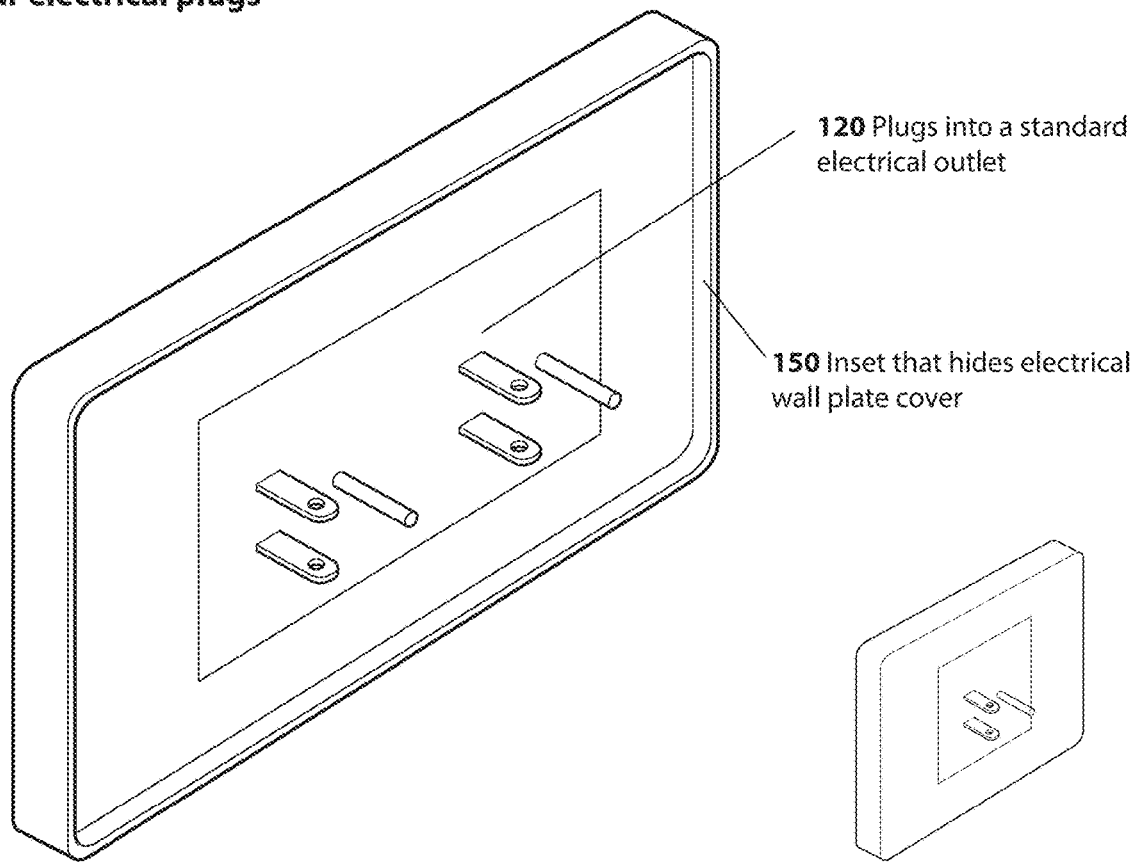
FIGS. 3A and 3B illustrate yet other example systems and apparatuses with rear-mounted electrical power outlet prongs, in accordance with an embodiment of the disclosure.

FIGS. 3A-3B illustrate yet another example system and apparatus with rear-mounted electrical power outlet prongs, in accordance with an embodiment of the disclosure. As shown in FIG. 3A, a perspective view of an external side of the housing, or the backside, shows two sets of the electrical power outlet prongs and an indention 150 around a perimeter of the housing that permits an external edge of the housing to fit over and hide or obscure the electrical power outlet wall plate. Each set of the electrical power outlet prongs can correspond to a respective wireless charger component, wireless charging pad, or magnetic charging station positioned on an opposing side of the housing.

Also shown, in FIG. 3B, is yet another example system and apparatus with rear-mounted electrical power outlet prongs, in accordance with an embodiment of the disclosure. As shown in FIG. 3B, a perspective view of an external side of the housing, or the backside, shows a single set of the electrical power outlet prongs and an indention 150 around a perimeter of the housing that permits an external edge of the housing to fit over and hide or obscure the electrical power outlet wall plate. The set of electrical power outlet prongs can correspond to a wireless charger component, wireless charging pad, or magnetic charging station positioned on an opposing side of the housing.

Figure 4:
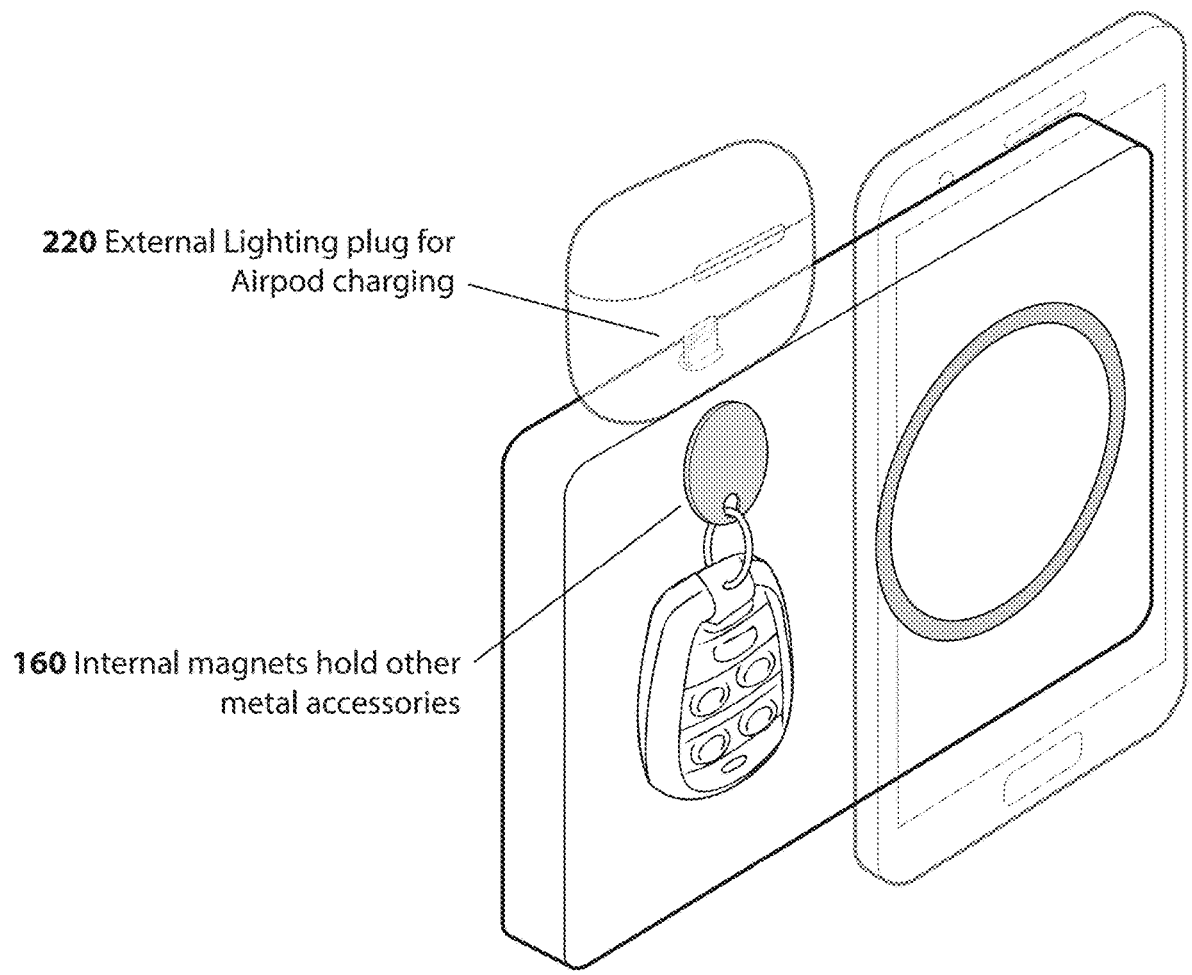
FIG. 4 illustrates yet another example system and apparatus with a single unit configured to support other accessories, in accordance with an embodiment of the disclosure.

FIG. 4 illustrates yet another example system and apparatus with a single unit configured to support other accessories, in accordance with an embodiment of the disclosure. As shown in FIG. 4, a perspective view of a single unit version of the example system and apparatus shows one wireless charging pad positioned on one lateral side of the housing. One or more internal magnets 160 can be positioned on the same lateral side of the housing for mounting or attaching any number of other household items with metal plates/parts, such as a circular metal key tab for a keyfob, adjacent to the wireless charging pad. An outline of an example wireless communication device is shown in a substantial vertical orientation mounted to the wireless charging pad. There is also shown on a lateral edge of the housing, an external Lightning™-type plug 230 for charging, as shown in outline, an Apple™ Airpods™ charging case or other device with a Lightning™-type receiving port.

Figure 5:
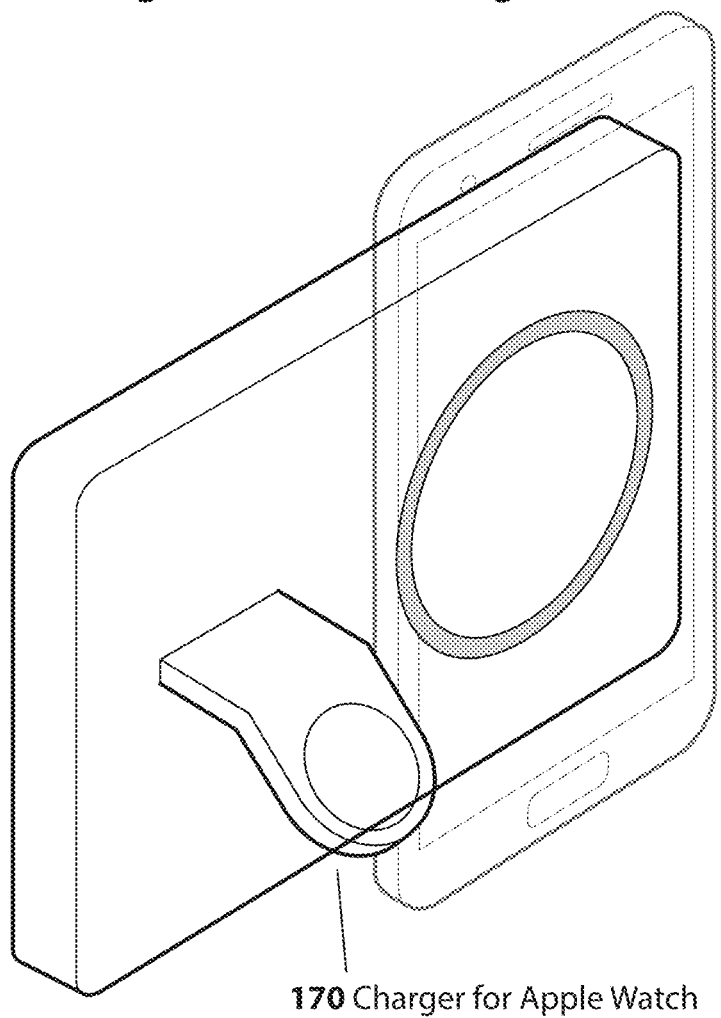
FIG. 5 illustrates yet another example system and apparatus with an integrated wireless charger, in accordance with an embodiment of the disclosure

FIG. 5 illustrates yet another example system and apparatus with an integrated wireless charger, in accordance with an embodiment of the disclosure. As shown in FIG. 5, a perspective view of the example system and apparatus shows a wireless charging pad positioned on one lateral side of the housing. Adjacent to the wireless charging pad on the same lateral side of the housing is a charging unit 170 with respective integrated magnetic charger for an Apple™ Watch or similar smartwatch.

Figure 6:
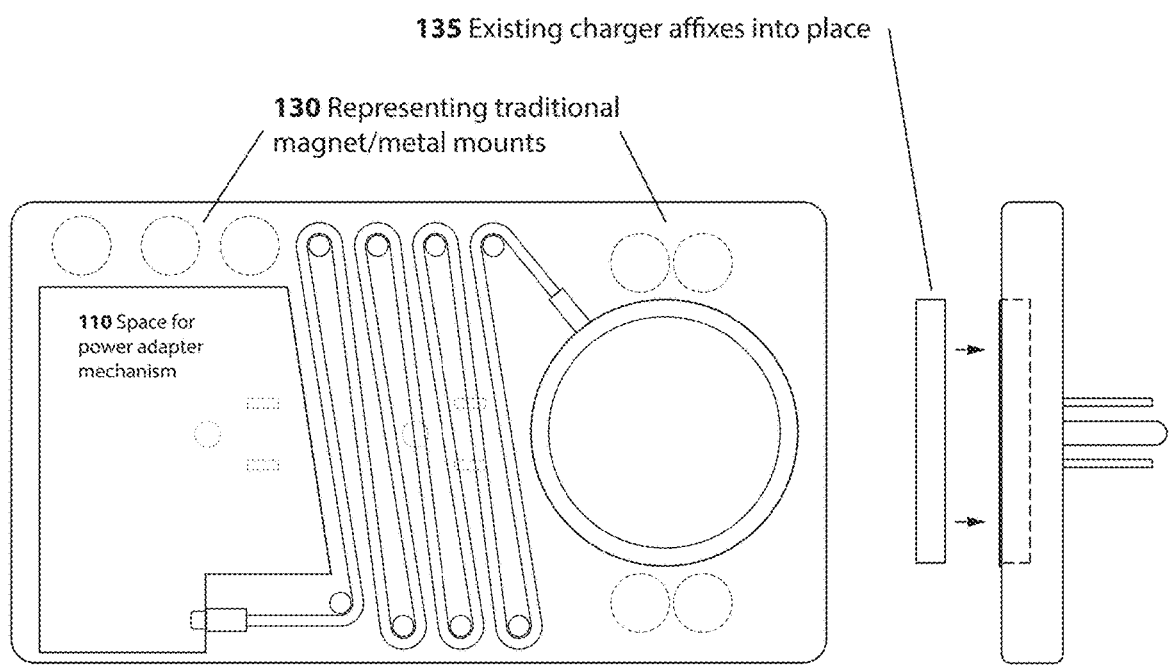
FIGS. 6A and 6B illustrate yet another example system and apparatus for a single unit using one existing wireless charger, in accordance with an embodiment of the disclosure.

FIGS. 6A-6B illustrate yet another example system and apparatus for a single unit using one existing wireless charger, in accordance with an embodiment of the disclosure. As shown in FIG. 6A, the front cutaway view, the example system and apparatus can include an internal compartment suitable for the placement of an internal power supply 110 within the housing and an existing wireless charger. As shown in FIG. 6B, a side view of an external side of the housing, a single set of the electrical power outlet prongs can provide an electrical current as needed from an electrical power outlet. The example system and apparatus shown can provide a way to hide or otherwise obscure an extended charging cable of the existing wireless charger, such as a charger using MagSafe™ technology, or a similar existing wireless charger. In one embodiment, such as shown as 135 in FIG. 6B, an existing charger can mount into a cavity or hole in a housing, and an associated cable can be routed to the charger within the housing. Further, sufficient internal housing space can be allocated for the internal power supply 110, and further internal housing space can be provided for one or more internally-mounted magnets 130 to accommodate one or more traditional magnet/metal mounts for a wireless communication device, such as a mobile phone or mobile phone case or housing. Further, one or more knobs or cable mounts can be positioned in the housing to permit threading or routing of the extended charging cable within the housing.

Figure 7:
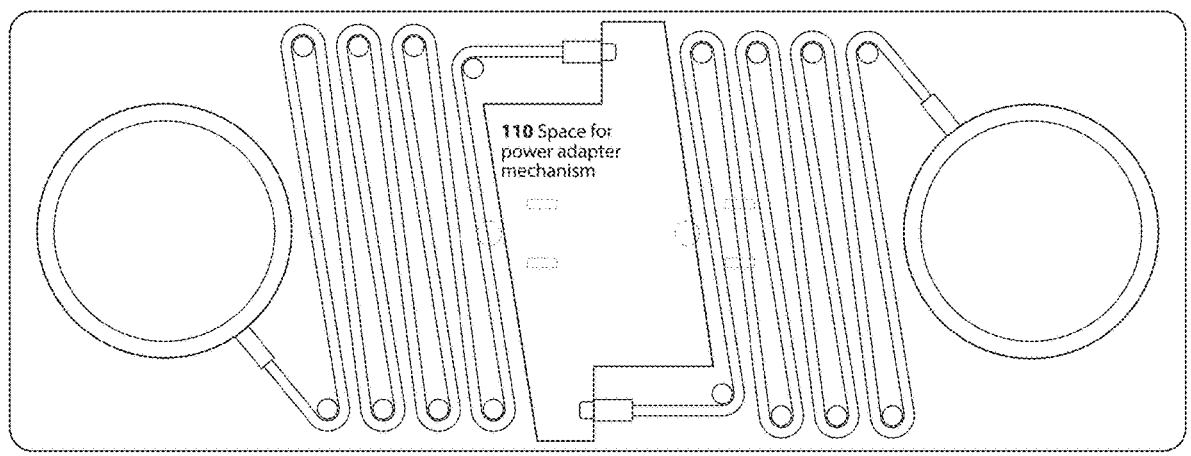
FIG. 7 illustrates yet another example system and apparatus for a dual unit using two existing wireless chargers, in accordance with an embodiment of the disclosure.

FIG. 7 illustrates yet another example system and apparatus for a dual unit using two existing wireless chargers, in accordance with an embodiment of the disclosure. As shown in the cutaway view of FIG. 7, the example system and apparatus can include an internal compartment suitable for the placement of an internal power supply 110 within the housing and two existing wireless chargers. The example system and apparatus shown can provide a way to hide or otherwise obscure the extended charging cables of two existing wireless chargers, such as those using MagSafe™ technology, or similar existing wireless chargers. Similar to that shown as 135 in FIG. 6B, an existing charger can mount into a cavity or hole in a housing, and an associated cable can be routed to the charger within the housing. Further, one or more knobs or cable mounts can be positioned in the housing to permit threading or routing of the extended charging cables within the housing.

Figure 8:
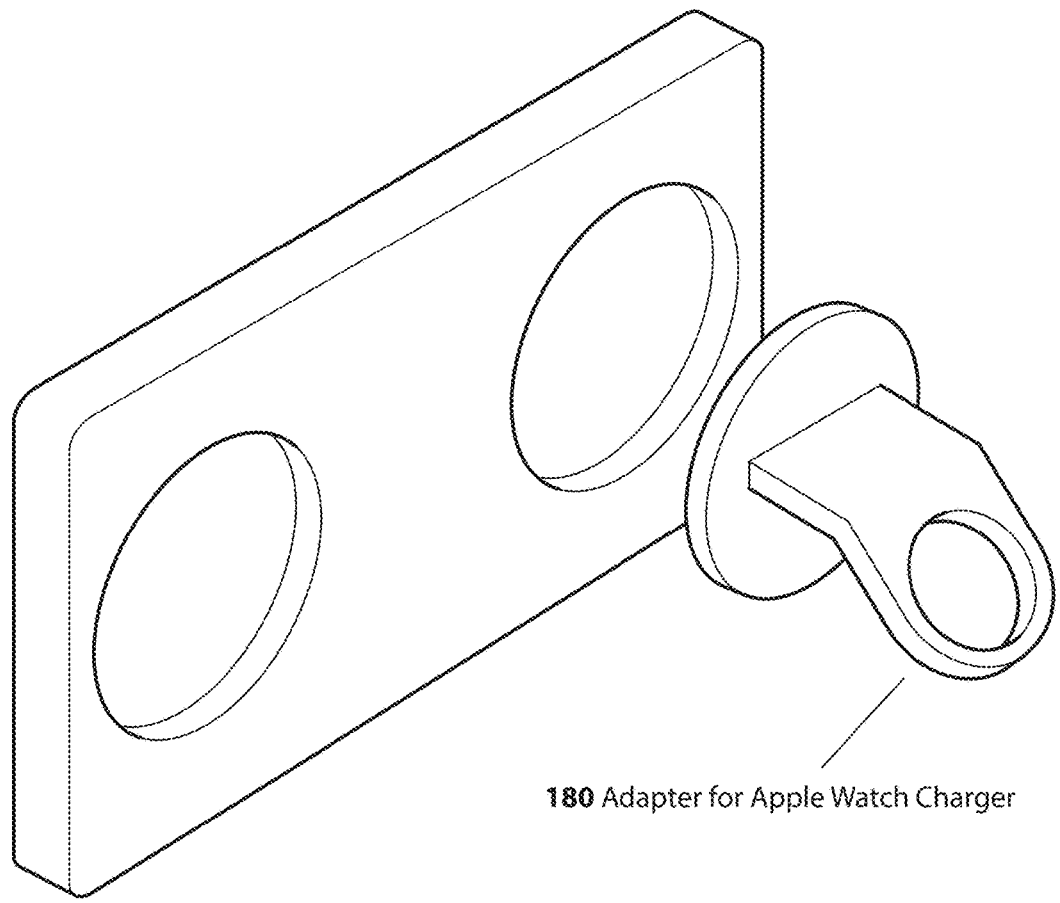
FIG. 8 illustrates yet another example system and apparatus with customizable options, in accordance with an embodiment of the disclosure.

FIG. 8 illustrates yet another example system and apparatus with customizable options, in accordance with an embodiment of the disclosure. As shown in FIG. 8, one or more cavities or bays can be provided in the housing for inserting any number of corresponding inserts into the housing. Each insert can include at least one charging device, at least one magnet, at least one bracket, and/or any other device desired to be mounted to the housing. In this manner, any number of other charging devices can be snapped-in or magnetically attached to the housing to provide the ability to customize each cavity or bay. Adjacent to or immediately behind each cavity or bay, a corresponding wireless charger device can be mounted inside the housing to provide a magnetic field and/or electrical current, as needed, to the corresponding insert. In the example shown in FIG. 8, an insert with a wireless charger adapter 180 for an Apple™ Watch charger, or a similar smartwatch adapter, can be provided.

Figure 9:
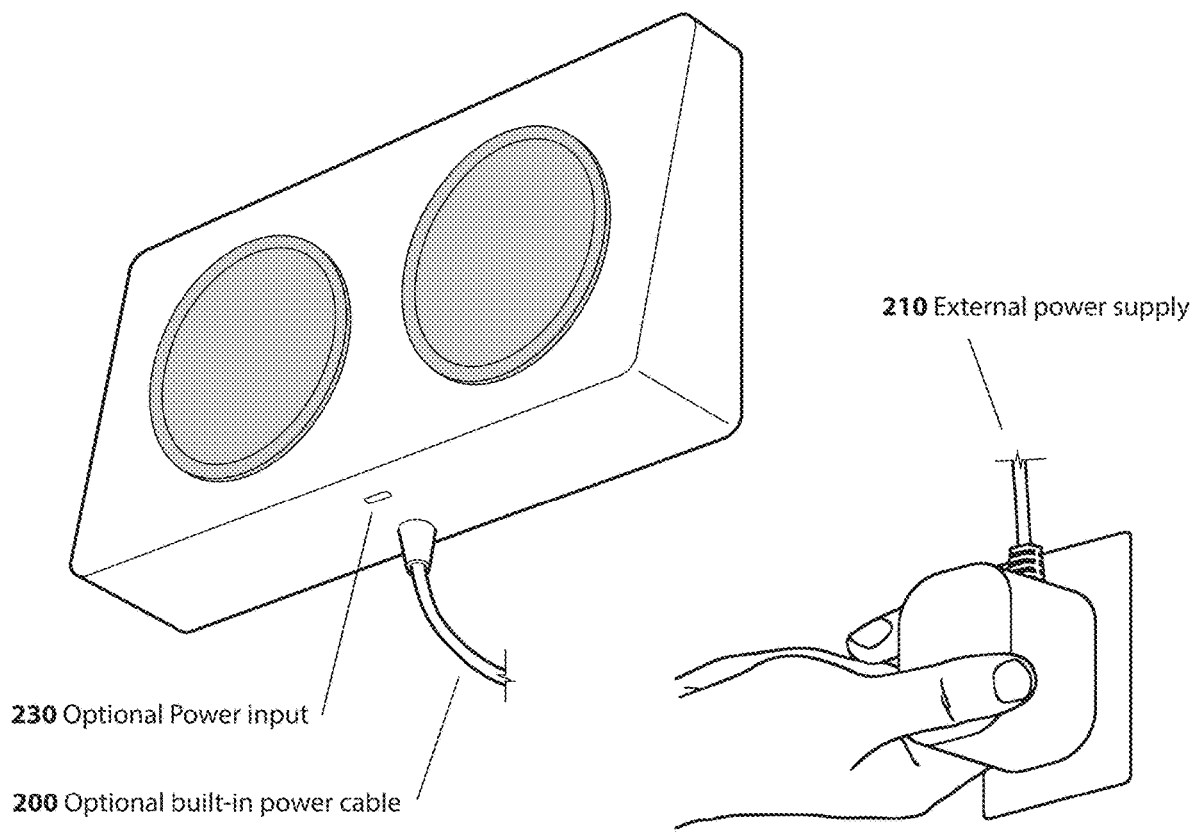
FIG. 9 illustrates yet another example system and apparatus with various plug-in options, in accordance with an embodiment of the disclosure.

FIG. 9 illustrates yet another example system and apparatus with various plug-in options, in accordance with an embodiment of the disclosure. As shown in FIG. 9, other plug-in options can include an optional built-in power cable 200 and optional external power supply 210. In this embodiment, the housing may include a rechargeable internal power supply, such as a battery, or may require an electrical current to provide current to one or more of the wireless charger pads mounted to the housing. Also shown in FIG. 9 is an optional power input 230, which can be configured to receive a connector configured to connect to an extended charger cable.

Figure 10A:
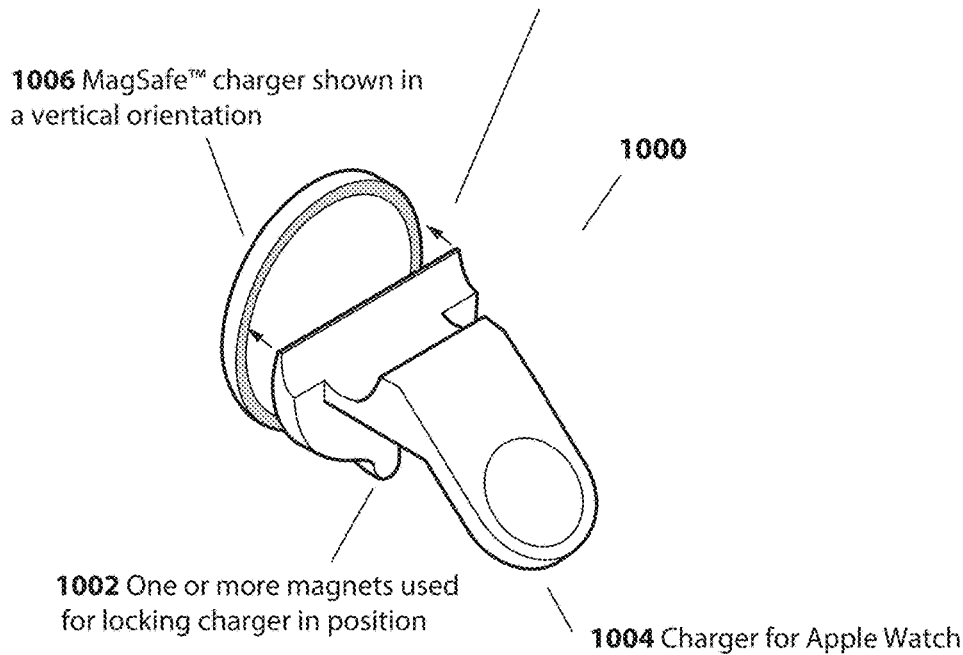
FIGS. 10A-10C illustrate yet another example system and apparatus with a standalone feature, in accordance with an embodiment of the disclosure.
Figure 10B:
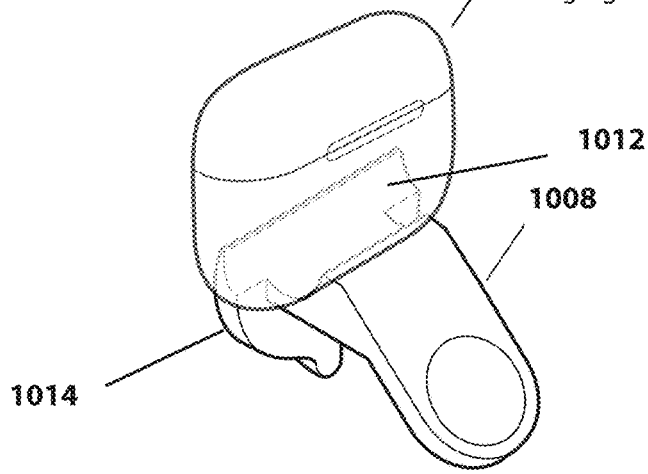
Figure 10C:
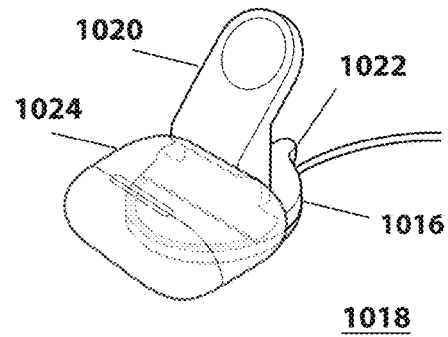

FIGS. 10A-10C illustrate yet another example system and apparatus a standalone feature, in accordance with an embodiment of the disclosure. As shown in FIG. 10A, which is a perspective view of a powered single unit version 1000, the system and apparatus can utilize one or more magnets 1002 for mounting a charger component 1004 to and extracting wireless power from a main structure 1006, for example, a Magsafe™ charger. The main structure 1006 is shown in relatively vertical orientation, which might be useful when mounted to a wall, electrical power outlet, or a vertical or near vertical surface.

As shown in FIG. 10B, a perspective view of a charger component 1008 for the system and apparatus is shown in conjunction with a charging case 1010 for a set of wireless earphones, such as Apple™ Airpods™. In this example, a contour 1012 on an upper surface of the charger component 1008 can be shaped to correspond with or otherwise support an outer surface of the charging case 1010 for a set of wireless earphones, wherein the charging case 1010 can be positioned upright or in a vertical orientation without any further assistance. In addition, the relative close proximity of the charging case 1010 with the charger component 1008, which is promoted by the contour 1012 of the charger component 1008 with the outer surface of the charging case 1010, permits an electrical charge to be generated to wirelessly charge the charging case 1010 by the charger component 1004. One or more magnets 1014 on the charger component 1008 can be used to mount the charger component to a main structure, similar to 1006 shown in FIG. 10A.

In the embodiment shown in FIG. 10C, a horizontal perspective view of the system and apparatus is shown, wherein a main structure 1016, for example, a Magsafe™ charger can be positioned on a substantially horizontal surface 1018, and a charger component 1020 mounted to the main structure 1016 using one or magnets 1022. Similar to the embodiments in FIGS. 10A and 10B, the charger component 1020 can facilitate charging of charging case 1024 for a set of wireless earphones, such as Apple™ Airpods™, wherein the charging case 1024 can be adjacent to a corresponding contour or other surface to permit the charging case 1024 to be in relatively horizontal orientation adjacent to the charger component 1020 and main structure 1016.

Associated methods of use of the various embodiments can be provided according to the present disclosure. For example, one method of use charger for a wireless communication device can include the following operations, including providing a housing with one or more prongs configured to mount to an electrical power outlet in a wall and receive an electrical current from the electrical power outlet; providing at least one wireless charger component configured to convert the electrical current to a magnetic field to charge a battery associated with the wireless communication device; and providing at least one magnetic mount configured to support the wireless communication device in a vertical or upright orientation against the housing while the battery of the wireless communication device is charging via the at least one wireless charger component.

Another associated method of use can include mounting a housing with one or more prongs to an electrical power outlet in a wall to receive an electrical current from the electrical power outlet; using at least one wireless charger component to convert the electrical current to a magnetic field to charge a battery associated with the wireless communication device; and using at least one magnetic mount to support the wireless communication device in a vertical or upright orientation against the housing while the battery of the wireless communication device is charging via the at least one wireless charger component.

In another embodiment, a method of use for charging a wireless communication device can include providing a housing with one or more prongs configured to mount to an electrical power outlet in a wall and to receive an electrical current from the electrical power outlet; providing at least two wireless charger components, each configured to convert the electrical current to a magnetic field to charge a respective battery associated with a respective wireless communication device; and providing at least two mounts, each configured to support a respective wireless communication device in a vertical or upright orientation against the housing while the respective battery of the respective wireless communication device is charging via at least one of the at least two wireless charger components.

Another associated method of use can include mounting a housing with one or more prongs to an electrical power outlet in a wall and to receive an electrical current from the electrical power outlet; using at least two wireless charger components to convert the electrical current to a magnetic field to charge a respective battery associated with a respective wireless communication device; and using at least two mounts to support a respective wireless communication device in a vertical or upright orientation against the housing while the respective battery of the respective wireless communication device is charging via at least one of the at least two wireless charger components.

Further, in another embodiment, a method of use for a charger for a wireless communication device can include providing a housing wherein the housing includes one or more prongs configured to mount to an electrical power outlet in a wall and receive an electrical current from the electrical power outlet; one or more bays or holes in at least one wall of the housing, each of the one or more bays or holes configured to receive a respective insert or plug-in component; wherein each of the respective insert or plug-in components include at least one of the following: a wireless charger component configured to convert the electrical current to a magnetic field to charge a battery associated with the wireless communication device; and at least one magnetic mount configured to support the wireless communication device against the insert or plug-in component.

Another associated method of use can include mounting a housing wherein the housing includes one or more prongs to an electrical power outlet in a wall and receive an electrical current from the electrical power outlet; one or more bays or holes in at least one wall of the housing, each of the one or more bays or holes configured to receive a respective insert or plug-in component; wherein each of the respective insert or plug-in components include at least one of the following: a wireless charger component configured to convert the electrical current to a magnetic field to charge a battery associated with the wireless communication device; and at least one magnetic mount configured to support the wireless communication device against the insert or plug-in component Throughout this application, the term "include", "include(s)" or "including" means "including but not limited to". Note that certain embodiments may be described relating to a single charging station, but the corresponding description should be read to include embodiments two or more, or multiple charging stations. One skilled in the art will recognize the applicability of the various embodiments for any number of charging stations, each of which can be designed to charge any chargeable wireless communication device or other chargeable electrical device that is designed to be mounted or supported by one or more magnets, or other means, and charge at the same time. The term "charging station" used throughout this application refers to the charging location of any device that charges the battery of another device including, but not limited to, headphones, earphones, a mobile phone, and smartwatches. The term "MagSafe" references Apple™ MagSafe™ technology or any other similar technology that allows one or more magnets and electrical charging to work together or near each other. Different features, variations, and multiple different embodiments are shown and described herein with various details. What has been described in this application at times in terms of specific embodiments is done for illustrative purposes only and without the intent to limit or suggest that what has been conceived is only one particular embodiment or specific embodiments. It is to be understood that this disclosure is not limited to any single specific embodiments or enumerated variations. Many modifications, variations and other embodiments will come to mind of those skilled in the art, and which are intended to be and are in fact covered by this disclosure. It is indeed intended that the scope of this disclosure should be determined by a proper legal interpretation and construction of the disclosure, including equivalents, as understood by those of skill in the art relying upon the complete disclosure present at the time of filing.

Conditional language, such as, among others, "can," "could," "might," or "may," unless specifically stated otherwise, or otherwise understood within the context as used, is generally intended to convey that certain implementations could include, while other implementations do not include, certain features, elements, and/or operations. Thus, such conditional language generally is not intended to imply that features, elements, and/or operations are in any way required for one or more implementations or that one or more implementations necessarily include logic for deciding, with or without user input or prompting, whether these features, elements, and/or operations are included or are to be performed in any particular implementation.

What has been described herein in the present specification and annexed drawings includes examples of systems, apparatus, devices, and techniques that, individually and in combination, permit the automated provision of an update for a vehicle profile package. It is, of course, not possible to describe every conceivable combination of components and/or methods for purposes of describing the various elements of the disclosure, but it can be recognized that many further combinations and permutations of the disclosed elements are possible. Accordingly, it may be apparent that various modifications can be made to the disclosure without departing from the scope thereof. In addition, or as an alternative, other embodiments of the disclosure may be apparent from consideration of the specification and annexed drawings, and practice of the disclosure as presented herein. It is intended that the examples put forth in the specification and annexed drawings be considered, in all respects, as illustrative and not limiting. Although specific terms are employed herein, they are used in a generic and descriptive sense only and not for purposes of limitation.

The invention claimed is:

1. A charger for a wireless communication device, comprising:
   a housing with one or more prongs configured to mount to an electrical power outlet in a wall and receive an electrical current from the electrical power outlet, the housing comprising at least one lateral side;
   at least one wireless charger component configured to convert the electrical current to a magnetic field to charge a battery associated with the wireless communication device; and
   at least one magnetic mount, the magnetic mount comprising a charging pad embedded in the lateral side, configured to support the wireless communication device in a relatively vertical or upright orientation, wherein the magnetic mount retains the wireless communication device substantially against the charging pad and lateral side of the housing while the battery of the wireless communication device is charging via the at least one wireless charger component.

2. The charger of claim 1, wherein the housing comprises a rectangular or other geometric shape and covers an entirety of the electrical power outlet.

3. The charger of claim 1, wherein the at least one magnetic mount comprises a magnet, a hook, an adhesive, a bracket, or a removable component.

4. The charger of claim 1, further comprising:
   an external connector configured to receive an electrical current or charge, or to provide an electrical current or charge to a wireless communication device or charger component for a wireless communication device.

5. A system for charging a wireless communication device, comprising:
   a housing with one or more prongs configured to mount to an electrical power outlet in a wall and to receive an electrical current from the electrical power outlet, the housing comprising at least one lateral side;
   at least two wireless charger components, each configured to convert the electrical current to a magnetic field to charge a respective battery associated with a respective wireless communication device; and
   at least two mounts, each configured to support a respective wireless communication device in a relatively vertical or upright orientation, the mounts comprising respective magnetic mounts and charging pads embedded in the lateral side, against the housing while the respective battery of the respective wireless communication device is charging via at least one of the at least two wireless charger components, wherein each of the respective magnetic mounts retain the respective wireless communication device substantially against the respective charging pad and lateral side of the housing.

6. The system of claim 5, further comprising a combination of backside electrical plugs and inclusion of upright magnetic connector technology charger(s), thus eliminating external cables.

7. The system of claim 5, further comprising an indented cavity on the backside that covers and hides outlet covers when the unit is plugged in.

8. The system of claim 5, further comprising one or more charging device inserts that mechanically or magnetically snap into place.

9. The system of claim 5, further comprising at least one internal power supply that powers one or more built-in chargers.

10. The system of claim 5, further comprising at least one magnetic connector technology charger that can be oriented parallel or closely parallel to a wall when the housing is mounted to the electrical power outlet.

11. The system of claim 5, further comprising at least one internal power supply with female plugs that accepts the male connectors of one or more existing charging devices to manually plug into it on the inside of the housing.

12. The system of claim 5, further comprising one or more bays or cavities on the housing that fit magnetic connector technology and other encasements that are made to hold existing charging devices or built-in charging devices.

13. The system of claim 5, further comprising one or more encasements for existing charging devices which insert into bays on the housing, wherein any associated cables can be enclosed and hidden within the housing.

14. The system of claim 5, further comprising one or more internal posts allowing cables to be routed to accommodate various lengths of cables.

15. The system of claim 5, further comprising a door, hatch, opening, or window configured to provide accessibility to the inside of the housing allowing the ability to add existing chargers and enclosing their cables within the housing.

16. The system of claim 5, further comprising an external charging connection protruding from the housing for charging a device or case for a device, such as an external USB-C connection protruding from the housing for charging an earphone charging case, and further comprising an indention on the housing surface that matches the shape of the earphone charging case.

17. The system of claim 5, further comprising a combining magnetic connector technology and one or more magnets to accommodate metal mounts for mounting a mobile communication device.

18. The system of claim 5, further comprising one or more internal magnets placed near the front side of the housing to allow placement/connection of various items to the outside of the housing.

19. The system of claim 5, further comprising at least one external power cable allowing the housing to be plugged into an electrical power outlet.

20. A charger for a wireless communication device, comprising:
a housing comprising:
one or more prongs configured to mount to an electrical power outlet in a wall and receive an electrical current from the electrical power outlet;
one or more bays or holes in at least one wall of the housing, each of the one or more bays or holes configured to receive a respective insert or plug-in component, the insert or plug-in component separable from the housing prior to or after charging the wireless communication device;
wherein each of the respective insert or plug-in components comprises at least one of the following:
a wireless charger component configured to convert the electrical current from the housing to a magnetic field to charge a battery associated with the wireless communication device; and
at least one magnetic mount configured to support the wireless communication device against the insert or plug-in component.

\* \* \* \* \*